United States Patent
Messinger et al.

(10) Patent No.: US 6,748,373 B2
(45) Date of Patent: Jun. 8, 2004

(54) SYSTEM AND METHOD FOR ADAPTIVELY OPTIMIZING QUERIES

(75) Inventors: Adam Messinger, San Francisco, CA (US); Seth White, San Francisco, CA (US)

(73) Assignee: Bea Systems, Inc., San Jose, CA (US)

( * ) Notice: Subject to any disclaimer, the term of this patent is extended or adjusted under 35 U.S.C. 154(b) by 54 days.

(21) Appl. No.: 10/244,884

(22) Filed: Sep. 17, 2002

(65) Prior Publication Data

US 2003/0208461 A1 Nov. 6, 2003

Related U.S. Application Data

(60) Provisional application No. 60/376,959, filed on May 1, 2002.

(51) Int. Cl.[7] .............................................. G06F 17/30
(52) U.S. Cl. ................................ 707/2; 707/3; 707/10; 707/100; 707/102; 707/103 R; 709/201; 709/219; 709/229; 717/108; 717/116; 717/165
(58) Field of Search .......................... 707/2, 3, 10, 100, 707/102, 103 R; 709/201, 219, 229; 717/108, 165, 116

(56) References Cited

U.S. PATENT DOCUMENTS

| | | | |
|---|---|---|---|
| 6,298,478 B1 * | 10/2001 | Nally et al. .................. | 717/170 |
| 6,411,969 B1 * | 6/2002 | Tam ............................ | 707/204 |
| 6,457,065 B1 * | 9/2002 | Rich et al. ................... | 709/328 |
| 2002/0049749 A1 * | 4/2002 | Helgeson et al. .............. | 707/3 |
| 2002/0077958 A1 * | 6/2002 | Gardner et al. ............... | 705/37 |
| 2002/0087563 A1 * | 7/2002 | Ghemawat et al. ......... | 707/100 |
| 2002/0124137 A1 * | 9/2002 | Ulrich et al. ................. | 711/113 |
| 2002/0147763 A1 * | 10/2002 | Lee et al. .................... | 709/202 |
| 2002/0152422 A1 * | 10/2002 | Sharma et al. ................ | 714/13 |
| 2003/0028682 A1 * | 2/2003 | Sutherland .................. | 709/315 |
| 2003/0056022 A1 * | 3/2003 | Carlson et al. .............. | 709/315 |
| 2003/0065827 A1 * | 4/2003 | Kufca et al. ................. | 709/315 |

OTHER PUBLICATIONS

Cheng–Wei–Chen et al., Runtime compositions and optimizations of parallel Javabean programs on clustering environments, Abstract only, International Conference on Parallel and Distributed Processing Techniques and Applications, vol. 4, Jun. 26–29, 2000.*
Code Generated for Supporting Associations between EJBs at EJB Creation Time, Abstract Only, IBM Corp. Nov. 9, 200.*
A Technique for virtually expanding queryable EJB CMP Entity Bean Fields, Abstract Only, IBM Corp., Feb. 2002.*

* cited by examiner

*Primary Examiner*—Jean R. Homere
(74) *Attorney, Agent, or Firm*—Fliesler Dubb Meyer & Lovejoy, LLP

(57) ABSTRACT

The performance of a database system can be improved by tracking the way in which data is accessed. By tracking such information, it is possible to load frequently-accessed fields of an entity bean, as well as related beans that are frequently accessed, by optimizing a field group for that entity bean. It is also possible to use the tracking information to prevent infrequently accessed fields from being automatically loaded. Information to be monitored can include how often each field is accessed, how many times a particular entity or application accesses a field, and how often a field is accessed for a given transaction context. By using this information to periodically optimize field groups, the fields and associated entity beans that are most often accessed, such as by the entity and/or transaction causing the entity bean to be loaded, can be automatically loaded when an entity bean is loaded into a container. This lowers database traffic and the volume of data transfer by simultaneously loading the fields most likely to be accessed, and not loading data unlikely to be accessed.

32 Claims, 2 Drawing Sheets

SYSTEM AND METHOD FOR ADAPTIVELY OPTIMIZING QUERIES

CLAIM OF PRIORITY

This application claims priority from U.S. provisional patent application "SYSTEM AND METHOD FOR ADAPTIVELY OPTIMIZING QUERIES", Application Ser. No. 60/376,959, filed May 1, 2002, incorporated herein by reference

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. Provisional Application No. 60/349,432 entitled "System and Method for Dynamic Querying," by Matt Shinn et al., filed Jan. 18, 2002.

FIELD OF THE INVENTION

The present invention relates to the querying of data, such as against a database.

BACKGROUND

Data in an Enterprise application is typically stored in a Database Management System (DBMS). Using such a DBMS system to manipulate data is awkward because the native language used by a DBMS is often proprietary and primitive. Enterprise JavaBeans (EJBs), or entity beans, provide a mechanism by which data stored in a DMBS can be manipulated in Java, which is a modern, object-oriented language.

A typical Java 2 Enterprise Edition (J2EE) platform includes one or more containers. A container is a runtime used to manage application components and provide access to J2EE application programming interfaces (APIs). An EJB container typically hosts Enterprise JavaBean components, such as entity beans or session beans. Apart from access to these infrastructure-level APIs, each container also implements a container-specific API, such as an EJB API. EJBs, or other application components, can be developed and hosted in the container.

EJB clients are typically applications that access EJB components in the containers. EJB clients can be application clients and components in the web container, such as Java servlets and JSP pages. A Java Database Connectivity (JDBC) API can provide a developer with the ability to connect to a relational database system. The API can allow transactional querying, retrieval, and manipulation from a JDBC-compliant database.

The EJB 2.0 specification, set forth by Sun Microsystems, Inc., of Santa Clara, Calif., defines a mechanism known as container managed persistence (CMP) by which the EJB implementation maps data in an DBMS to entity beans. This mapping includes both mapping to values in a DBMS and mapping of relations between entities in the DBMS.

Multiple CMP entity beans can have container-managed relationships among themselves using a local model with local interfaces. Instance variables for a bean can be designated as container-managed persistence fields or container-managed relationship fields. These fields can be defined in the appropriate deployment descriptor, for example. The values of these fields can be retrieved and set using public accessor methods, or getter and setter methods, which can be defined in an entity bean. Getter and setter methods can be declared public and abstract in a bean implementation class. The bean itself does not provide an implementation for these methods, as the methods are provided by the EJB container.

To implement a local model, an entity bean such as a customer entity bean can use its home interface to extend an EJB local home interface. The home interface includes finder methods for this bean. The home interface can be used to declare the finder methods, while the deployment descriptor contains the implementation of these methods. The customer bean can also define a local interface through which clients on the container can access methods for that bean. By default, a CMP implementation can load all mapped CMP values in a bean when the bean is first accessed. First access does not also cause related values to be loaded. The related values are instead faulted in when they are first used. Even if a user can control which mapped data should be loaded and which data should be faulted, a problem exists in how to predict or monitor how data will be used so as to improve system performance.

BRIEF SUMMARY

Systems and methods in accordance with the present invention provide for increased performance in data transfer and data storage systems. An entity bean instance having a number of fields, each representing a data item in a database, can be loaded into a container. A container-managed persistence mechanism can be used to monitor the accessing of each of these fields, such as by an EJB application. Using information gathered in the monitoring, a field group for the entity bean can be optimized. An optimized field group can allow the fields and associated entity beans that are most often accessed for a given entity bean can be automatically loaded when an entity bean is loaded into a container in an attempt to reduce the number of hits to the database. Access to a bean can be tracked by the entity and/or transaction causing the entity bean to be loaded. The fields that are least frequently accessed can be excluded from those that are automatically loaded, in order to reduce the amount of data transferred.

For instance, a counter can be updated for any field in the entity bean when that field is accessed, such as through the use of abstract accessor methods surrounding that field. The way in which the entity bean is accessed can be tracked, such as by using finder methods of a container interface used to access the entity bean. The way in which a transaction was started that accessed the entity bean can also be tracked, such as by annotating transaction context to include the way in which the transaction was started.

The optimization of a field group using this information can occur at regular time intervals, after a number of updates, periodically, or each time a bean is accessed. The optimization can include a balancing of the cost of loading a field with the frequency of loading a field. Field groups can also be optimized for applications and transactions that access the entity bean.

Any or all of the above optimization methods can be used to further optimize any such the field groups. This can adaptively optimize queries by pre-loading data that a query is most likely to access, while not loading data that a query is not likely to access.

Other features, aspects, and objects of the invention can be obtained from a review of the specification, the figures, and the claims.

DETAILED DESCRIPTION

Through tuning field groups carefully, EJB application deployers can reduce the traffic, both volume of data and number of round trips, to and from a database, thereby increasing performance. An example can include Bean 1, which has fields A and B, as well as reference C to another bean, Bean 2. If A and C are frequently used, but B is not, then a field group can be defined that loads A and Bean 2 each time Bean 1 is first accessed, but can defer the reading of B until the B field is actually accessed. When compared to the default behavior, this would reduce the number of round trips by loading both Beans 1 and 2 at the same time, and would reduce the volume of data by not loading B.

Figure 1:
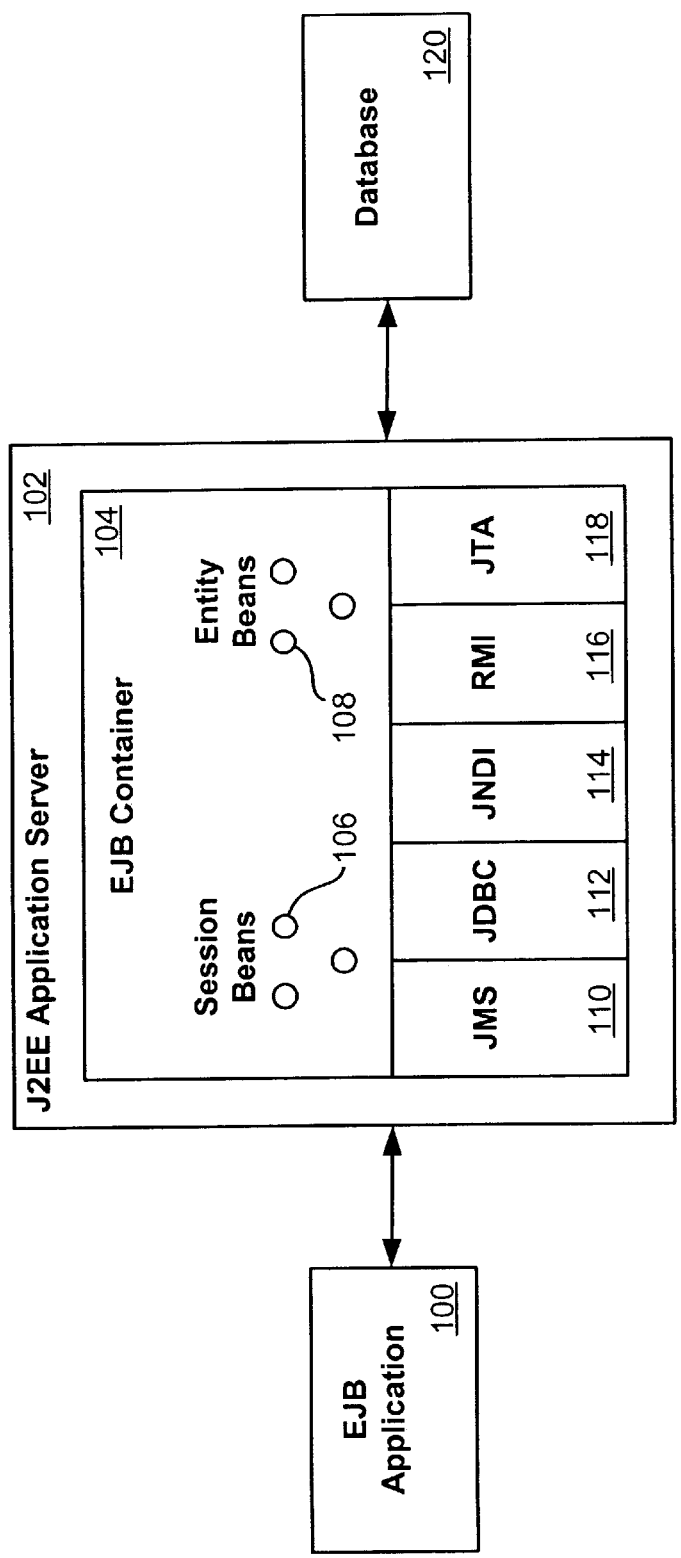
FIG. 1 is a diagram of a system in accordance with one embodiment of the present invention.

System and methods in accordance with the present invention can use a CMP implementation to adaptively optimize the field groups based on the observed behavior of an application. This can be accomplished, for example, with the system of FIG. 1. The CMP implementation can include, for example, an EJB container 104 in a J2EE application server 102. The container 104 can contain session beans 106 or entity beans 108. The container 104 can also include J2EE APIs 110, 112, 114, 116, 118 that can be used to access data from a Java Message Store or database 120, for example. Since the CMP implementation serves as the intermediary between an EJB application 100 and a database 120, for example, the implementation is in an ideal situation to observe the data used in a running application, as well as to tune the field group to provide optimal performance. The implementation can produce optimized field groups for a particular entity bean in the container 104. As such, the optimized field groups are not only dynamically generated, but also can be more expressive than, for example, standard field groups. Field groups are a component of one CMP implementation that can be used to control which mapped data is loaded and which data is faulted. This control can be accomplished, for example, by allowing an EJB deployer to specify which mapped data should be loaded aggressively and which should be faulted in as needed.

Figure 2:
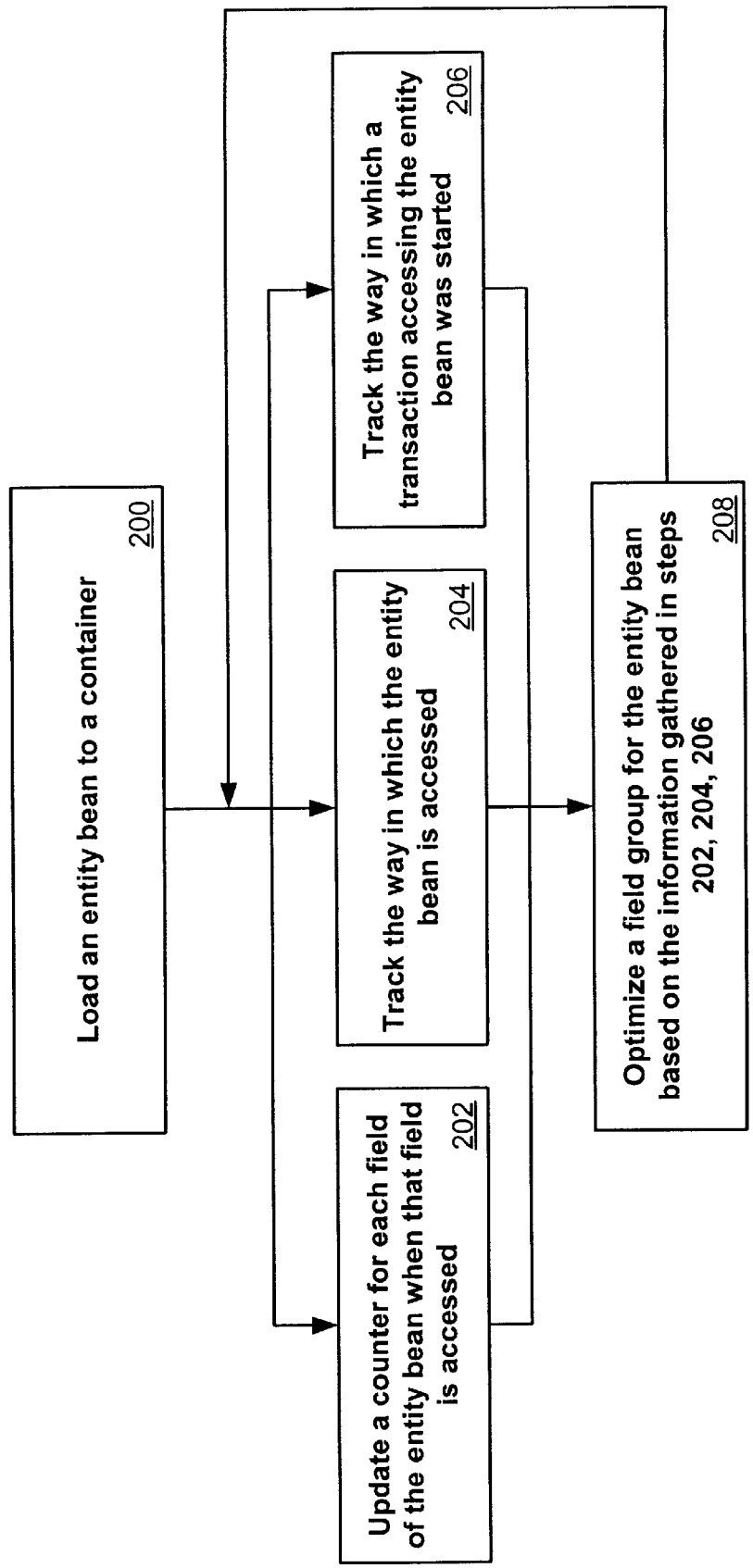
FIG. 2 is a flowchart showing a method that can be used with the system of FIG. 1.

To implement this optimization, data about the behavior of the application can be captured. This can be done, for example, using a method such as the one shown in FIG. 2. An entity bean can be loaded to a container 200. Any or all of three main types of data can be captured or tracked for the entity bean. How often a field is accessed can be monitored, for example, such as by using a counter for each field that is updated when that field is accessed 202. The ways in which the bean is first accessed can be monitored 204, as well as the way in which transactions accessing the beans were started 206. A field group for the entity bean can then be optimized using the information gathered in these steps 208.

Information about which fields are accessed can be easily obtained through instrumentation added to the code, which the CMP implementation can generate. In particular, CMP abstract accessor methods surrounding each field can be used to increment a counter. Abstract accessor methods can be used to manage relationships. An abstract accessor parameter or return value type can be a class that represents this relationship.

Information about how beans are accessed can be obtained through instrumenting the code generated finder methods of a CMP home, as well as through further instrumentation added to the accessor methods. Specifically, the finder methods and foreign relation accessors can mark each bean loaded with the name of the finder or relation. Later, when fields are accessed, the accessor methods can maintain a separate counter for each unique finder or relation.

Information about how the transaction was started that accessed a bean can be obtained through the transaction context. Each transaction started by an EJB implementation can be annotated to reflect the bean and method name which caused the transaction to be started. Later, when fields are accessed, the accessor methods can keep a separate counter for each unique transaction annotation.

After some period of application execution, optimization of the field groups can take place based on gathered information. The optimization can attempt to trade off the cost of an operation, such as loading a field or a referent bean, against the frequency of that operation, the cost of a fault, and the memory usage constraints, in order to determine the optimal field group. For example, a field that is used infrequently can be included in the field group if the cost of a fault is high relative to the cost of loading a field. On the other hand, a field that is used relatively frequently, but is very expensive to load, can be excluded because the cost of a fault is similar to the cost of loading the field.

The cost allocated to load and faults can be based on a heuristic behavior, or on an observed behavior. Heuristics can be based on parameters that can change, depending on the backing DBMS. Alternatively, the costs of operations can be observed by profiling certain operations, so as to better adapt to the DBMS with which the CMP implementation is deployed. The expected frequency of the operation can be inferred from collected historical data, for example.

Based on the different types of data collected, optimized field groups can be generated for at least: the bean as a whole, for particular mechanisms that access the bean, and for particular transactions which access the bean. Any type of optimization can be valuable, depending upon the usage patterns of the application.

Such additions can allow the throughput of the system to increase by reducing the traffic to the DBMS. Traffic can be reduced in two dimensions in one embodiment, including the number of queries executed and the amount of data transferred. These additions can also improve the usability of a product by making such optimization automatic, rather than relying on a manual process. In addition, these optimized field groups can be more expressive than the current field groups, which can allow for more aggressive optimizations.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for increasing performance in a database system, comprising:

loading an entity bean to a container, the entity bean having a number of fields each representing an item in a database;

monitoring the access of each of the number of fields; and optimizing a field group for the entity bean based on the monitoring, the field group defining which of the number of fields is loaded when the entity bean is accessed.

2. A method according to claim 1, wherein:

loading an entity bean occurs in response to a request from an application.

3. A method according to claim 1, wherein:

loading an entity bean occurs for a transaction.

4. A method according to claim 1, further comprising:

updating a counter for one of the number of fields in the entity bean when that field is accessed, the counter being used in monitoring the access of each of the number of fields.

5. A method according to claim 4, wherein:

updating a counter for one of the number of fields is accomplished through the use of abstract accessor methods surrounding that field.

6. A method according to claim 1, further comprising:

tracking the way in which the entity bean is accessed, the tracking being used in monitoring the access of each of the number of fields.

7. A method according to claim 6, wherein:

tracking the way in which the entity bean is accessed includes using finder methods of a container interface used to access the entity bean.

8. A method according to claim 1, further comprising:

tracking the way in which a transaction was started that accessed the entity bean, the tracking being used in monitoring the access of each of the number of fields.

9. A method according to claim 8, wherein:

tracking includes annotating transaction context to include the way in which the transaction was started that accessed the entity bean.

10. A method according to claim 1, wherein:

optimizing occurs at regular time intervals.

11. A method according to claim 1, wherein:

optimizing occurs each time a bean is accessed.

12. A method according to claim 1, wherein:

optimizing includes balancing the cost of loading one of the number of fields with the frequency of loading that field.

13. A method according to claim 1, further comprising:

optimizing a field group for applications that access the entity bean.

14. A method according to claim 1, further comprising:

optimizing a field group for transactions that access the entity bean.

15. A method according to claim 1, wherein:

optimizing the field group further includes determining when other beans should be loaded when the entity bean is accessed, the field group including links to the other beans.

16. A method according to claim 1, wherein:

monitoring the access of each of the number of fields includes allowing a container-managed persistence implementation to observe the fields being used by an application accessing the bean.

17. A method reducing the amount of network traffic between an application and a database, comprising:

monitoring an entity bean for the use of fields in the entity bean and references to other beans; and optimizing a field group defining which fields and other beans should be loaded when the entity bean is accessed.

18. A method for reducing the amount of data transferred between an application and a database, comprising:

monitoring an entity bean for the use of fields in the entity bean; and optimizing a field group for the entity bean such that seldom-accessed fields are not loaded automatically when the entity bean is accessed.

19. A method for increasing performance in a database system, comprising:

first monitoring the access of each field of an entity bean;

second monitoring the way in which the entity bean is accessed;

third monitoring the way in which transactions accessing the entity bean are started, the first, second, and third monitoring capable of being done in at least one of concurrently and in any order; and optimizing a field group for the entity bean in response to at least one of the first, second, and third monitoring.

20. A method according to claim 19, further including:

annotating a transaction context to reflect the identity of each entity starting a transaction that accesses a field.

21. A system for increasing performance in a database system, comprising:

a container adapted to contain entity beans;

an entity bean in the container, the entity bean adapted to contain a plurality of fields each representing a data item in a database; and a container managed persistence mechanism adapted to monitor the accessing of each of the plurality of fields, the container-managed persistence mechanism further adapted to optimize a field group for the entity bean based on the monitoring, the field group defining which of the plurality of fields is loaded when the entity bean is accessed.

22. A system according to claim 21, wherein:

the container managed persistence mechanism is further adapted to load an entity bean in response to a request from an application.

23. A system according to claim 21, wherein:

the container managed persistence mechanism is further adapted to update a counter for each of the plurality of fields in the entity bean when that field is accessed, the counter being used in monitoring the access of each of the plurality of fields.

24. A system according to claim 21, wherein:

the container managed persistence mechanism is further adapted to update a counter for each of the plurality of fields through the use of abstract accessor methods.

25. A system according to claim 21, wherein:

the container managed persistence mechanism is further adapted to track the way in which the entity bean is accessed, the tracking being used in monitoring the access of each of the plurality of fields.

26. A system according to claim 21, wherein:

the container managed persistence mechanism is further adapted to track the way in which the entity bean is accessed by using finder methods of a container interface used to access the entity bean.

27. A system according to claim 21, wherein:

the container managed persistence mechanism is further adapted to track the way in which a transaction accessing the entity bean was started, the tracking being used in monitoring the access of each of the number of fields.

28. A system according to claim 21, wherein:

the container managed persistence mechanism is further adapted to annotate transaction context to track the way in which the transaction accessing the entity bean was started.

29. A system according to claim 21, wherein:

the container managed persistence mechanism is further adapted to determine which other beans that should be loaded when the entity bean is accessed, the field group including links to the other beans.

30. A system according to claim 21, further comprising:

a database connectivity component providing the ability to connect to a relational database system.

31. A system according to claim 21, further comprising:

a database connectivity component providing the ability to execute queries on a database.

32. A system according to claim 21, further comprising:

an application server housing the container.

* * * * *

UNITED STATES PATENT AND TRADEMARK OFFICE
CERTIFICATE OF CORRECTION

PATENT NO. : 6,748,373 B2
DATED : June 8, 2004
INVENTOR(S) : Messinger

It is certified that error appears in the above-identified patent and that said Letters Patent is hereby corrected as shown below:

<u>Title page,</u>
Item [*] Notice, delete the phrase "by 54 days" and insert -- by 61 days --.

Signed and Sealed this

First Day of November, 2005

JON W. DUDAS
*Director of the United States Patent and Trademark Office*